United States Patent
Sanzari

[11] Patent Number: 5,487,304
[45] Date of Patent: Jan. 30, 1996

[54] SUPERCONDUCTING DUAL JUNCTION GYROSCOPE APPARATUS

[75] Inventor: Martin A. Sanzari, Hamburg, N.J.

[73] Assignee: Kearfott Guidance and Navigation Corporation, Wayne, N.J.

[21] Appl. No.: 108,125

[22] Filed: Aug. 17, 1993

[51] Int. Cl.[6] .................................................. G01P 3/44
[52] U.S. Cl. ................................. 73/504.07; 324/248
[58] Field of Search ............... 73/505, 578; 324/207.25, 324/207.18, 207.19, 248, 233; 505/845, 846, 872; 307/91; 335/216

[56] References Cited

U.S. PATENT DOCUMENTS

| H39 | 3/1986 | Gubser et al. | 204/192 |
|---|---|---|---|
| 3,331,041 | 7/1967 | Bogner | 335/216 |
| 3,439,256 | 2/1967 | Kahńe | 324/207.25 |
| 3,591,474 | 7/1971 | Goodkind et al. . | |
| 3,657,927 | 4/1972 | Tyson | 73/505 |
| 4,797,646 | 1/1989 | Saji et al. | 335/301 |
| 5,058,431 | 10/1991 | Karwacki | 73/505 |
| 5,283,523 | 2/1994 | Uhl et al. | 324/248 |

*Primary Examiner*—Hezron E. Williams
*Assistant Examiner*—Helen C. Kwok
*Attorney, Agent, or Firm*—Klauber & Jackson

[57] ABSTRACT

A gyroscope for detecting angular velocity includes a closed housing having a plurality of nested layers of superconducting material with the majority of these nested layers being divided so as to disrupt the path of superelectrons traveling within the superconducting material of these nested layers. These nested layers of superconducting material shield the interior of the closed housing from external magnetic fields and prevent the generation of a London moment field within the closed housing when the housing is rotated. A gyroscope sensor is securely mounted within the closed housing for detecting the rotation of the housing. The gyroscope sensor is comprised of a gyroscope sensor block having a plurality of sensor device faces where a corresponding plurality of gyroscope sensor devices are situated. Each of the plurality of gyroscope sensor devices is comprised of a multilayer superconducting thin film structure.

19 Claims, 2 Drawing Sheets

SUPERCONDUCTING DUAL JUNCTION GYROSCOPE APPARATUS

FIELD OF THE INVENTION

The present invention relates to gyroscopes and, more particularly, to a low cost and light weight superconducting gyroscope having a superconducting shield for shielding external magnetic fields and eliminating an internal London moment field when the shield is rotated.

BACKGROUND OF THE INVENTION

Typically, a guidance or a navigation system will contain a gyroscope for determining the rate of angular motion of a vehicle. Early gyroscopes were comprised of a rotating wheel which was mounted so that its axis could turn freely in certain or all directions. These early gyroscopes were capable of maintaining the same direction in space despite the movements of its mountings and surrounding parts. Its motion was based upon the principle that a body rotating rapidly about an axis will tend to resist a disturbing change or torque by rotating slowly in a direction perpendicular to the disturbance. These early gyroscopes were mostly used in conjunction with non-precise vehicle steering equipment. Thus, these early gyroscopes were generally sufficient for determining and maintaining a relatively reliable directional heading.

However, due to inaccuracies produced by friction between moving parts, temperature changes, and inadequate manufacturing tolerances, these early mechanical gyroscopes have been replaced by other types of gyroscope devices which require no moving parts. A description of one of these other types of gyroscope devices, based on the principle of superconductivity, is disclosed in U.S. Pat. No. 3,657,927, awarded to Tyson. In this type of gyroscope, a current enters a superconducting ring where it is split into two branches. In one branch the current is traveling clockwise, and in the other branch the current is traveling counterclockwise. Both of these oppositely traveling currents pass through a Josephson junction within its respective branch. When the superconducting ring is rotated, a circulating current is generated. This circulating current causes a positive phase shift to occur in the wavefunction in one branch and a negative phase shift to occur in the wavefunction in the other branch. Upon recombination, interference is created between the two wavefunctions. This interference manifests itself as an alternating current at the output of the device. The phase change of the output current is proportional to the rotational frequency of the ring. This device is also sensitive to changes in the magnetic flux surrounding the device. These changes in the magnetic flux, due to external magnetic fields, are falsely detected as a rotation of the superconducting ring. The effect of these external magnetic fields is minimized by using a superconducting shield.

While the above-described device provides a gyroscope that is functionally non-mechanical, a problem exists with regard to the superconducting shield that this device has incorporated therein. The major problem with the superconducting shield is the formation of an internal magnetic field that develops when the superconducting shield is rotated. This magnetic field is known as the London moment field. The magnitude of this magnetic field has the same linear relationship with rotation as the above mentioned device. As the device is rotated, so is the superconducting shield. Thus, the London moment field generated by the superconducting shield has the same value as the field generated by the device. Since the shield provides a field value that minimizes the energy state of the device, the device does not react to the rotation. Therefore there is no output from the superconducting gyroscope when it is surrounded by a superconducting shield.

Accordingly, it would be desirable to overcome the problem that exists with the superconducting shield as described above, while providing a gyroscope, based on the principle of superconductivity, that is functionally non-mechanical and that is shielded from external magnetic fields.

SUMMARY OF THE INVENTION

The present invention solves the above mentioned London moment field problem by eliminating a closed electron path that is present in the above described prior art superconducting shield. A London moment field is caused by a dragging effect that is encountered by electrons that are traveling within the penetration depth of the material in the superconducting shield. The London moment field is due to the angular momentum of these dragging electrons around the surface of the shield. However, as is revealed by the present invention, a discontinuity may be formed in a superconducting shield so as to disrupt the current flow of these dragging electrons such that a London moment field will not form. A superconducting shield having such a discontinuity will still attenuate external magnetic fields through the generation of local eddy currents, which expel the external magnetic fields. However, these local eddy currents will not contribute to the generation of a London moment field.

The kinetic inductance is increased through the use of obstructions to the supercurrent in the shielding material, which causes a Bernoulli effect that increases the change in the supercurrent due to the rotation of the gyroscope. This phenomenon is explained in a paper by W. A. Little Entitled, "Device Application of SuperInductors", published in, "The Proceedings of the Symposium of the Physics of Superconducting Devices", which was sponsored by the Office of Naval Research, Physics Branch, and which was held at the University of Virginia on Apr. 28–29, 1967.

The present invention also provides a method for increasing the surface area of a superconducting gyroscope without increasing the magnetic inductance or the packaging size of the device. This is accomplished through the use of thin film patterning techniques, wherein a spiral pattern is used to increase the effective sensing area of the gyroscope.

From the above descriptive summary it is apparent how the present invention overcomes the problem associated with the above mentioned prior art devices while providing a gyroscope, based on the principle of superconductivity, that is functionally non-mechanical and that is shielded from external magnetic fields.

Accordingly, the primary objective of the present invention is to shield a superconducting gyroscope device from external magnetic fields and eliminate the presence of a London moment field when the shield is rotated.

Another objective of the present invention is to minimize the magnetic permeability in a superconducting gyroscope and its windings without having a London moment field form due to the rotation of superconducting shield.

Another objective of the present invention is to utilize thin film technology and high temperature superconductors in the fabrication of superconducting gyroscopes.

Another objective of the present invention is to maximize the kinetic induction effects in a superconducting gyroscope.

Another objective of the present invention is to increase the surface area of a superconducting gyroscope without increasing the magnetic inductance or the packaging size of the device.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE INVENTION

Figure 1:
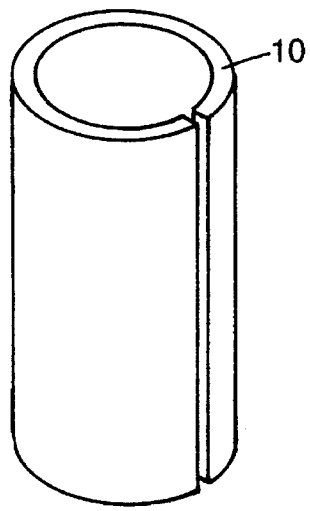
FIG. 1 is a three-dimensional view of a superconducting cylindrical shield divided in the axial direction according to the present invention.

Referring to FIG. 1, a superconducting cylindrical shield 10 is shown divided in the axial direction. This division can be a separation along the entire axis of the cylindrical shield or a scribe etched axially into a superconducting thin film which has been deposited on a non-superconducting mu-metal cylinder. The separation, or scribe, is typically about 20 microns wide, and, according to the present invention, is used to disrupt the path of electrons traveling in the axial direction along the surface of the superconducting material. Such an electron path disruption will result in the breakup of an attendant London moment field since, as previously described, a London moment field is caused by a dragging effect that is encountered by electrons traveling along the surface of a superconducting shield. In other words, a London moment field is caused by a purely angular momentum effect. Thus, if the path of the electrons is disrupted, the coherence of the electron wavefunction in the axial direction is broken and the angular momentum of the electrons is interrupted, thereby causing an attendant London moment field to break up. A typical London field can be represented by the following equation, $$B = \frac{-2mc}{e}\omega \quad (1)$$

wherein B is the value of the London moment field, m is the mass of an electron, c is the speed of light, e is the charge of an electron, and e is the rotational speed of the superconducting material.

Figure 2:
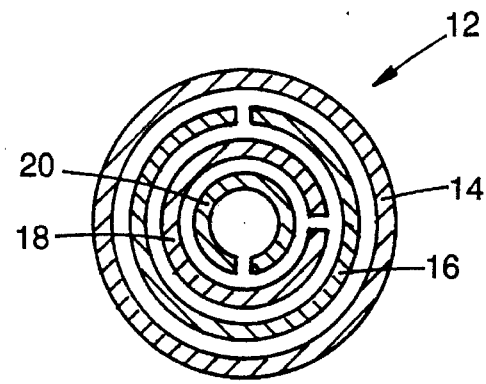
FIG. 2 is a cross-sectional view of a nested superconducting shield configuration according to the present invention.

Referring to FIG. 2, a nested configuration 12 is shown having an undivided mu-metal cylindrical outer shield 14 and three divided superconducting cylindrical shields 16,18, 20 concentrically disposed within this outer shield 14. The three inner shields 16,18,20 may be made entirely of superconducting material or they may be made of thin film layers of superconducting material deposited on either the inner or the outer surfaces of concentrically disposed mu-metal cylinders with scribes formed therein. In the former case, a buffer layer of non-superconducting material must separate each shield 14,16,18,20. In the latter case, each thin film layer 16,18,20 must be at least 0.5 microns thick. The outer shield 14 attenuates any external magnetic fields and the inner shields 16, 18, 20 attenuate any remaining magnetic fields. To minimize flux passage there between, the inner shields 16,18,20 are positioned with their divisions rotated approximately 45° from each other.

Figure 3:
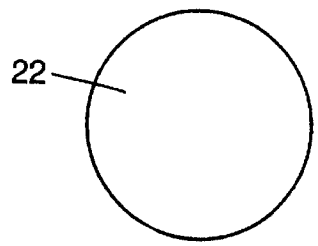
FIG. 3 is a top view of a solid disc used to shield the inside of a superconducting cylindrical shield from external magentic fields at the top and bottom of the superconducting cylindrical shield according to the present invention.
Figure 4:
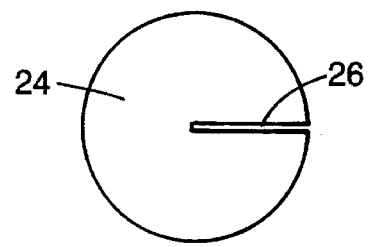
FIG. 4 is a top view of a grooved disc used to disrupt the formation of a London moment field in the top and bottom of a superconducting cylindrical shield according to the present invention.

Referring to FIGS. 3 and 4, there is shown a solid mu-metal disc 22 and a superconducting disc 24 having a 20 micron division 26 formed radially therein, respectively. A combination of these discs 22,24 are used to shield the ends of the nested configuration 12 shown in FIG. 2. Similar to the cylindrical shields 14,16,18,20 shown in FIG. 2, the superconducting disc 24 may be made entirely of a superconducting material or may be made of a thin film layer of superconducting material deposited on the surface of a mu-metal disc with a scribe formed therein. Each thin film layer must be at least 0.5 microns thick. The combination of these discs 22,24 used to shield the ends of the nested configuration 12 is such that the solid mu-metal disc 22 is used as an outer shield and several superconducting discs 24 are used as inner shields in a multilayer arrangement. The solid mu-metal disc 22 attenuates any external magnetic fields and the several superconducting discs 24 attenuate any remaining magnetic fields. Also similar to the cylindrical shields 16,18,20 shown in FIG. 2, the several superconducting discs 24 are positioned with their divisions rotated approximately 45° from each other so as to minimize flux passage therebetween.

Figure 5:
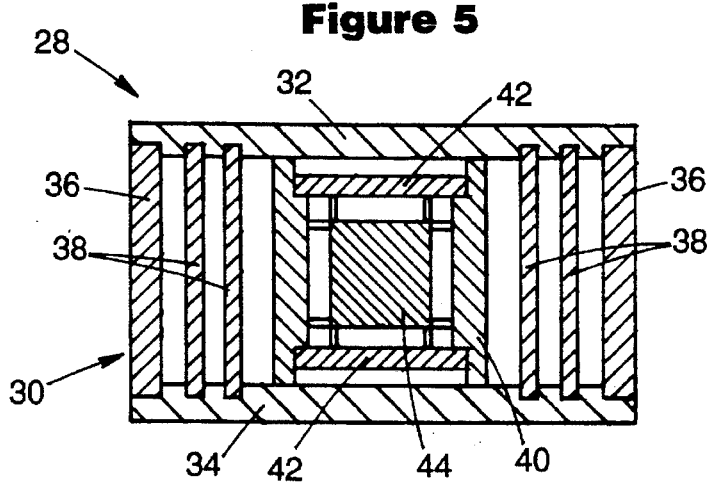
FIG. 5 is a cross-sectional view of one embodiment of a superconducting gyroscope according to the present invention.

Referring to FIG. 5, there is shown a cross-sectional view of an embodiment of a present invention superconducting gyroscope device 28. This device 28 is comprised of a mu-metal box 30 having a top 32, a bottom 34, and sides 36. Mounted within the mu-metal box 30 are printed circuit boards 38 for accommodating control and detection circuits. Also mounted within the mu-metal box 30 is a nested cylinder configuration 40 having nested mu-metal and thin film superconducting shields as shown in FIG. 2. The nested cylinder configuration 40 is closed at both ends by a multilayer disc arrangement 42 having mu-metal and thin film superconducting shields as shown in FIGS. 3 and 4. Mounted within the nested cylinder configuration 40 is a gyroscope sensor block 44.

It should be noted that the interior of the mu-metal box 30 must be kept at a temperature no higher than the critical temperature of the superconducting materials being used. For example, the common superconducting material of Yttrium/Barium/Copper/Oxide ($YBa_2Cu_3O_7$) must be kept below its critical temperature of 90° K.

Figure 6:
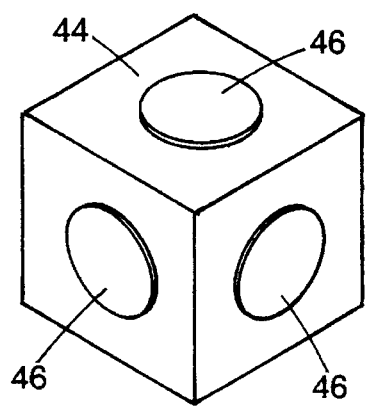
FIG. 6 is three-dimensional view of the gyroscope sensor block shown in FIG. 5.
Figure 7:
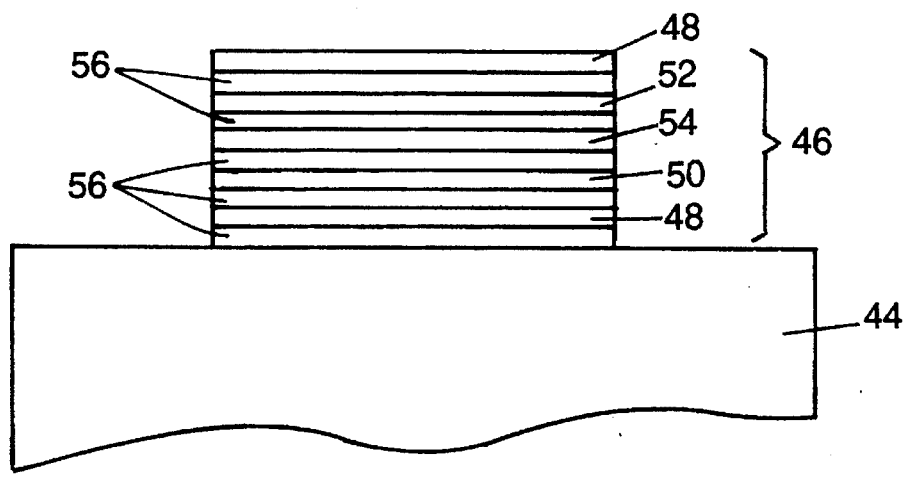
FIG. 7 is an enlarged cross-sectional view of a superconducting thin film structure suitable for use in the gyroscope shown in FIG. 5.

Referring to FIG. 6, the gyroscope sensor block 44 is shown in three dimensions. The gyroscope sensor block 44 accommodates three gyroscopes 46, one for each axis. Each gyroscope 46 is comprised of a multilayer high temperature superconducting thin film structure having two magnetic shielding layers 48, one right handed spiral 50, one left handed spiral 52, and one dual junction SQUID 54. Each of these layers is separated by an insulating layer 56, as shown in FIG. 7.

Figure 8:
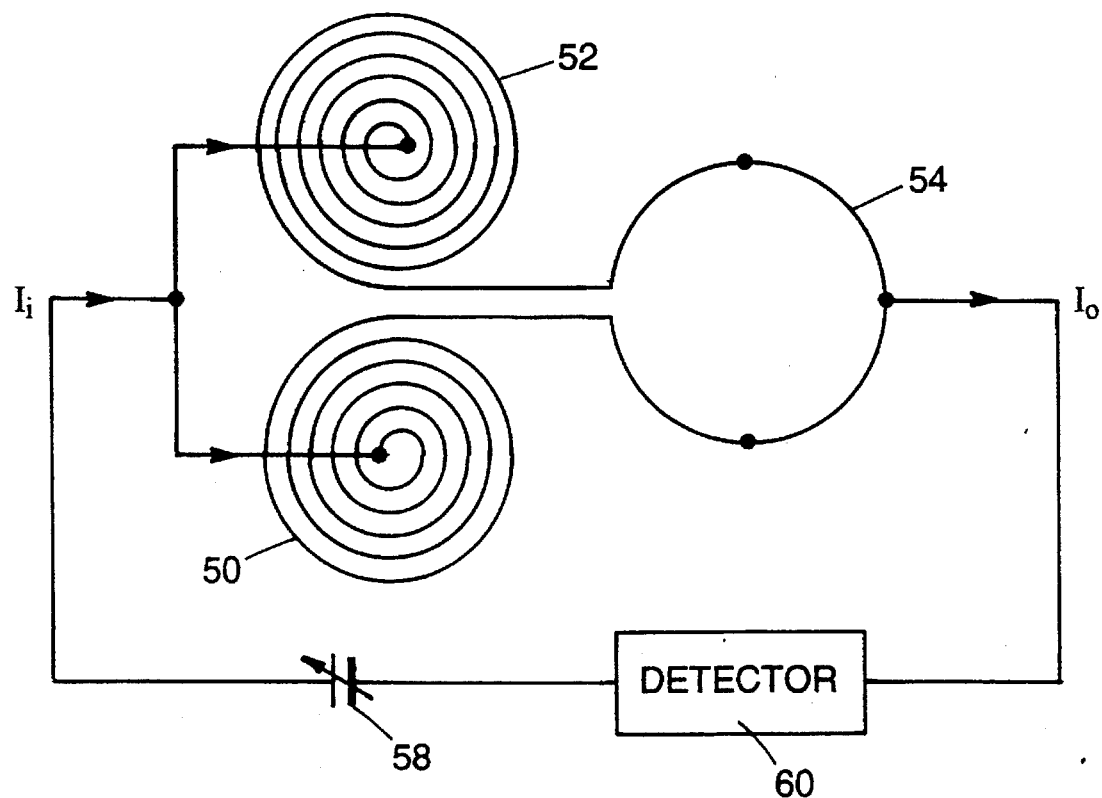
FIG. 8 is a schematic representation of a superconducting gyroscope according to the present invention.

Referring to FIG. 8, there is shown a schematic representation of one of the three gyroscopes 46 along with its associated control and detection circuitry. As shown in FIG. 8, the gyroscope 46 and the control and detection circuitry is comprised of a right handed spiral 50, a left handed spiral 52, a dual junction SQUID 54, a current source 58, and a phase detector 60. The current source 58 generates a continuous input current, represented by $I_i$, for the right and left handed spirals 50 and 52, respectively. The phase detector 60 measures the phase change in the output current, which is represented by $I_o$.

A simple dual junction SQUID device, without spiral input legs, is governed by the following equation, $$I = I_c \sin\left[\frac{8\pi mS}{h} \omega + 2\pi \frac{\Phi}{\Phi_0}\right] \quad (2)$$

wherein $I_c$ is the value of the critical current, S is the area enclosed by the dual junction SQUID, h is equal to Planck's constant, $\Phi$ is value of the external magnetic flux, and $\Phi_0$ is the value of a fluxoid which is represented by the following equation, $$\Phi_0 = \frac{hc}{2e} \quad (3)$$

Equation (2) can be rewritten as, $$I = I_c \sin[\phi_\omega + \phi_\Phi] \quad (4)$$

wherein $\phi_\omega$ is the phase due to rotation, and $\phi_\Phi$ is the phase due to magnetic flux. The change in phase due to rotation is represented by the following equation, $$\Delta\phi_\omega = \frac{4\pi m}{h} \int_c [\omega \times r] \, dl = \frac{4\pi m}{h} \int_s 2\omega \, da = \frac{8\pi mS}{h} \omega \quad (5)$$

Examination of the first integral in equation (5) reveals that integrating around a spiral path results in an increase in the sensitivity of the gyroscope when the effective enclosed area S of the SQUID is increased. Let this increased sensitivity due to the effective increased area of the SQUID be represented by $\beta$.

It is well known that the phase of the output current in a gyroscope, represented in FIG. 8 by $I_0$, will change due to a change in rotation, or angular velocity. In equation (5), the expression, $\omega S$, can be thought of as the circulation, while the expression, $h/8\pi m$, can be thought of as a quantum circulation. The effective circulation due to rotation, or angular velocity, can be increased by increasing the kinetic inductance of the superconducting spirals. Analogously, the kinetic inductance of a ring can be represented by the following equation, $$L_k = \frac{2mr}{a^2 e^2 \rho} \quad (6)$$

wherein r is the radius of the ring, $\rho$ is electron density, and a is the cross-sectional radius of the ring.

From equation (6), it can be seen that the kinetic inductance increases as one over the square of the cross-sectional radius of the ring. Thus, the smaller the cross-sectional area of the ring, the greater the kinetic inductance. Since the spirals 50,52 and the SQUID 54 in each gyroscope 46 are fabricated with thin film layers of superconducting material having extremely small pattern dimensions, typically 0.5 μm high and 20 μm wide, the kinetic inductance can be increased by many orders of magnitude.

The kinetic inductance can be further increased by obstructing the flow of electrons in the superconducting thin film layers. This is achieved by doping the superconducting material with impurities. Such doping will cause flux pinning in the superconducting thin film layers whereby individual magnetic flux lines are able to penetrate the superconducting thin film layers while, since electrons cannot pass through these flux lines, electrons must travel around these flux lines. This effect increases the speed of the electrons as the current density must be preserved. This effect will also increase the sensitivity of the device to rotation. Let the effects of the increase in kinetic inductance be represented by $\alpha$.

It should be noted that the kinetic inductance can also be increased by laser drilling holes in the superconducting thin film layers so that the effective width of the thin film layers are decreased and the electrons must flow around the voids in the material.

Any external magnetic flux entering the spirals 50,52 or the dual junction SQUID 54 will be perceived as a rotation. To minimize this effect, the magnetic inductance must be minimized in the spirals 50,52 and in the dual junction SQUID 54. Analogously, the magnetic inductance of a ring can be represented by the following equation, $$L_m = \mu r \left[ \ln\left(\frac{8r}{a}\right) - 2 \right] \quad (7)$$

wherein $\mu$ is the magnetic permeability of the ring.

From equation (7), it can be seen that the magnetic inductance increases as one over the natural log of the cross-sectional radius of the ring. However, it does not increase as rapidly as the kinetic inductance as a function of cross-sectional radius. The magnetic inductance can be driven to zero by minimizing the magnetic permeability. The magnetic permeability will go to zero as the material inside the ring becomes perfectly diamagnetic. Thus, by using a superconductor as a perfect diamagnetic, the magnetic inductance will go to zero.

Totally enclosing the spirals 50,52 and the SQUID 54 in a superconducting shield would minimize the magnetic inductance if the superconducting shield did not generate a London moment field as represented in equation (1). As previously described, such a London moment field influences the electrons in the spirals 50,52 and in the SQUID 54 and renders rotational measurement impossible. Thus, thin film layers 48 of the superconducting material must be used in the same manner as described in the case of the multilayered disc arrangement 42. These thin film layers 48 must be scribed and stacked with their scribes rotated from each other so as to minimize flux passage therebetween. Accordingly, these thin film layers 48 act as shields for minimizing the magnetic inductance in the spirals 50,52 and in the SQUID 54. Let the effects of the decrease in magnetic inductance be represented by $\lambda$.

Referring to FIG. 7, the multilayer high temperature superconducting thin film structure 46 is shown. This multilayer high temperature superconducting thin film structure 46 is formed on a substrate 44, which is also the gyroscope sensor block, that is suitable for accommodating high temperature superconducting materials. For purposes of this description, let the superconducting material be Yttrium/Barium/Copper/Oxide ($YBa_2Cu_3O_7$) and let the substrate 44, or the gyroscope sensor block, be either Strontium/Titanate ($SRTiO_3$) or Lanthanum/Aluminate ($LaAlO_3$). Of course, other superconducting or substrate materials may be substituted for those just mentioned. The first layer in the gyroscope structure 46 is an insulating layer 56. Over the insulating layer 56 is a scribed thin film shielding layer 48 of superconducting material which acts as the diamagnetic in equation (7). This shielding layer 48 is followed by another insulating layer 56 and then a right hand spiral patterned layer 50 of superconducting material. The right handed spiral layer 50 is followed by another insulating layer 56 and then a dual junction SQUID patterned layer 54 of superconducting material. The dual junction SQUID layer 54 is followed by another insulating layer 56 and then a left hand spiral patterned layer 52 of superconducting material. Small holes in the insulating layers 56 provide paths for the right handed 50 and left handed 52 spirals to be connected to the dual junction SQUID 54. The left handed spiral layer 52 is covered with another insulating layer 56 and then another scribed thin film shielding layer 48 of superconducting material which also acts as the diamagnetic in equation (7).

Equation (2) may now be rewritten by inserting the increased effective area parameter $\beta$, the kinetic inductance parameter $\alpha$, and the magnetic inductance parameter $\lambda$ so as to yield the following equation, $$I = I_c \sin\left[ \frac{8\pi m \alpha \beta S}{h} \omega + 2\pi\lambda \frac{\Phi}{\Phi_0} \right] \quad (8)$$

As the magnetic permeability goes to zero, The magnetic inductance, $\lambda$, also goes to zero such that equation (7) now becomes, $$I = I_c \sin\left[ \frac{8\pi m \alpha \beta S}{h} \omega \right] \quad (9)$$

The change in phase due to rotation can now be expressed by the following equation, $$\Delta\phi_\omega = \frac{8\pi m \alpha \beta S}{h} \Delta\omega \quad (10)$$

By increasing the effective area of the SQUID by approximately 100, the parameter $\beta=100$. By increasing the cross-sectional area of the superconducting thin film layer patterns by approximately 10, the parameter $\alpha=100$. By letting the enclosed area of the dual junction SQUID be approximately 1.0 cm$^2$, the variable S=0.0001. By inserting these values in equation (10), the change in phase due to rotation may now be expressed by the following equation, $$\Delta\phi_\omega = \frac{8\pi m (100)(100)(0.0001)}{h} \Delta\omega \quad (11)$$

If, for example, the phase detector 60 detects a phase shift of 0.01 radians, then the detectable change in rate may be represented by the following equation, $$\Delta\omega = \frac{(0.01)h}{8\pi m(10)} = 2.894 \times 10^{-7} \frac{\text{radians}}{s} \approx 0.06 \frac{\text{degrees}}{hr} \quad (12)$$

Equation (12) represents a typical change in the rate of rotation of the above-described gyroscope device 28. Thus, this device 28 is aimed primarily at medium accuracy requirement applications (1 to 10 degrees per hour error rates), but may be applicable to other accuracy ranges as well. With the use of thin film technology, this device 28 is also aimed at applications where cost in quantity production is an overriding consideration.

Accordingly, with the present invention gyroscope device 28 now fully described it is evident that the objectives set forth above have been efficiently attained and, since certain changes may be made in the above described device 28 without departing from the scope of the invention, it is intended that all matter contained in the above description or shown in the accompanying drawings shall be interpreted as illustrative and not in a limiting sense.

What is claimed is:

1. A superconducting dual junction gyroscope apparatus having a superconducting shield for shielding external magnetic fields and preventing the generation of a London moment field when said superconducting shield is rotated, said apparatus comprising:

a closed housing having an outer layer of mu-metal material and a plurality of nested layers of superconducting material, said plurality of nested layers of superconducting material being divided so as to introduce discontinuities in the superconducting material of said plurality of nested layers and thereby disrupt superelectrons traveling within the superconducting material of said plurality of nested layers; and a gyroscope sensor securely mounted within said housing for detecting a rotation of said housing.

2. The apparatus as defined in claim 1, wherein said gyroscope sensor comprises:

a gyroscope sensor block having a plurality of sensor device faces; and a plurality of gyroscope sensor devices corresponding to said plurality of sensor device faces, wherein each of said plurality of gyroscope sensor devices is [situated] formed on a corresponding one of said plurality of sensor device faces.

3. The apparatus as defined in claim 2, wherein each of said plurality of gyroscope sensor devices comprises a multilayer superconducting thin film structure.

4. The apparatus as defined in claim 3, wherein said multilayer superconducting thin film structure comprises:

a right hand spiral patterned thin film layer of superconducting material;

a left hand spiral patterned thin film layer of superconducting material;

a dual junction SQUID patterned thin film layer of superconducting material;

a pair of thin film shielding layers of superconducting material for shielding said right hand spiral patterned layer, said left hand spiral patterned layer, and said dual junction SQUID patterned layer from magnetic fields; and a plurality of insulating layers disposed between said right hand spiral patterned layer, said left hand spiral patterned layer, said dual junction SQUID patterned layer, and said pair of thin film shielding layers.

5. The apparatus as defined in claim 4, wherein said superconducting material in said right hand spiral patterned layer and said left hand spiral patterned layer is doped with impurities so as to increase the kinetic inductance.

6. The apparatus as defined in claim 4, wherein said right hand spiral patterned layer and said left hand spiral patterned layer are drilled with holes so as to increase the kinetic inductance.

7. The apparatus as defined in claim 4, wherein said superconducting material in said right hand spiral patterned layer, said left hand spiral patterned layer, said dual junction SQUID, and said pair of thin film shielding layers is a high temperature superconducting material so as to increase the kinetic inductance.

8. The apparatus as defined in claim 7, wherein said high temperature superconducting material is Yttrium/Barium/Copper/Oxide (YBa$_2$Cu$_3$O$_7$).

9. The apparatus as defined in claim 1, further comprising a current source for providing electrical current to said gyroscope sensor.

10. The apparatus as defined in claim 9, further comprising a phase detector for detecting phase shifts in said electrical current.

11. The apparatus as defined in claim 1, further comprising means for maintaining the interior of said housing at or below the critical temperature of said superconducting material.

12. The apparatus as defined in claim 1, wherein said outer layer of mu-metal material comprises a hollow cylindrical outer shield of mu-metal material, wherein said plurality of nested layers of superconducting material comprise a plurality of hollow cylindrical inner shields of superconducting material, wherein said plurality of hollow cylindrical inner shields of superconducting material are concentrically disposed, within said hollow cylindrical outer shield of mu-metal material and within each other, and wherein said plurality of hollow cylindrical inner shields of superconducting material are divided so as to introduce discontinuities in the superconducting material of said plurality of hollow cylindrical inner shields and thereby disrupt superelectrons traveling within the superconducting material of said plurality of hollow cylindrical inner shields.

13. The apparatus as defined in claim 12, wherein said hollow cylindrical outer shield of mu-metal material comprises a cylindrical side wall of mu-metal material and first and second end discs of mu-metal material, wherein said cylindrical side wall of mu-metal material has opposing first and second open ends, wherein said opposing first and second open ends of said cylindrical side wall of mu-metal material are covered by said first and second end discs of mu-metal material, respectively, wherein said plurality of hollow cylindrical inner shields of superconducting material comprise a plurality of cylindrical side walls of superconducting material and a corresponding plurality of first and second end discs of superconducting material, wherein each of said cylindrical side walls of superconducting material has opposing first and second open ends, wherein said opposing first and second open ends of each of said cylindrical side walls of superconducting material are covered by corresponding said first and second end discs of superconducting material, respectively, wherein said plurality of cylindrical side walls of superconducting material are divided so as to introduce discontinuities in the superconducting material of said plurality of cylindrical side walls and thereby disrupt superelectrons traveling within the superconducting material of said plurality of cylindrical side walls, and wherein said plurality of first and second end discs of superconducting material are divided so as to introduce discontinuities in the superconducting material of said plurality of first and second end discs and thereby disrupt superelectrons traveling within the superconducting material of said plurality of first and second end discs.

14. The apparatus as defined in claim 13, wherein said first and second end discs of mu-metal material and said plurality of first and second end discs of superconducting material are structured in a first multilayer end disc and a second multilayer end disc, respectively, wherein said first multilayer end disc is structured so as to have an outer layer of mu-metal material and a plurality of inner layers of superconducting material, wherein said second multilayer end disc is structured so as to have an outer layer of mu-metal material and a plurality of inner layers of superconducting material, and wherein said plurality of inner layers of superconducting material in both said first multilayer end disc and said second multilayer end disc are divided so as to introduce discontinuities in the superconducting material of said plurality of inner layers in both said first multilayer end disc and said second multilayer end disc and thereby disrupt superelectrons traveling within the superconducting material of said plurality of inner layers in both said first multilayer end disc and said second multilayer end disc.

15. The apparatus as defined in claim 13, wherein said discontinuities in said plurality of cylindrical side walls of superconducting material are positioned approximately 45° from each other so as to minimize flux passage therebetween.

16. The apparatus as defined in claim 15, wherein said plurality of cylindrical side walls of superconducting material are made entirely of superconducting material, and wherein buffer layers of non-superconducting material are disposed between said plurality of cylindrical side walls of superconducting material and said cylindrical side wall of mu-metal material.

17. The apparatus as defined in claim 15, wherein said plurality of cylindrical side walls of superconducting material are made of thin film layers of superconducting material deposited on a corresponding plurality of concentrically disposed mu-metal cylinders with scribes formed therein.

18. The apparatus as defined in claim 14, wherein said discontinuities in said plurality of inner layers of superconducting material in both said first multilayer end disc and said second multilayer end disc are positioned approximately 45° from each other so as to minimize flux passage therebetween.

19. The apparatus as defined in claim 18, wherein said plurality of inner layers of superconducting material in both said first multilayer end disc and said second multilayer end disc are made of thin film layers of superconducting material deposited on a plurality of layered mu-metal discs with scribes formed therein.

* * * * *